United States Patent
Tye

(12) United States Patent (10) Patent No.: US 6,533,504 B1
Tye (45) Date of Patent: Mar. 18, 2003

(54) BOTTLE CAP ELEVATOR

(76) Inventor: David Tye, 16311 Waikiki La., Huntington Beach, CA (US) 92649

(*) Notice: Subject to any disclaimer, the term of this patent is extended or adjusted under 35 U.S.C. 154(b) by 0 days.

(21) Appl. No.: 09/766,296

(22) Filed: Jan. 19, 2001

Related U.S. Application Data

(60) Provisional application No. 60/247,331, filed on Nov. 10, 2000.

(51) Int. Cl.[7] .............................................. B65G 53/04
(52) U.S. Cl. ............................ 406/93; 406/75; 406/153
(58) Field of Search ........................... 406/75, 93, 124, 406/153

(56) References Cited

U.S. PATENT DOCUMENTS

| | | | | |
|---|---|---|---|---|
| 2,900,138 A | * | 8/1959 | Strate | 239/61 |
| 3,650,369 A | * | 3/1972 | Vergobbi | 198/33 AA |
| 3,747,738 A | * | 7/1973 | Greck | 198/33 AA |
| 4,278,240 A | * | 7/1981 | Archenholtz | 266/216 |
| 4,576,526 A | * | 3/1986 | Muller et al. | 406/75 |
| 5,713,494 A | * | 2/1998 | Kaiju et al. | 222/199 |

* cited by examiner

*Primary Examiner*—Christopher P. Ellis
*Assistant Examiner*—Joe A. Dillon, Jr.

(57) ABSTRACT

An apparatus for sending bottle caps to a remote elevated location has a first hopper for temporarily storing bottle caps. The first hopper receives a supply of bottle caps. A feeder has an upper end and a lower end. The upper end of the feeder is coupled with the first hopper to receive bottle caps. A second hopper for receiving bottle caps from the feeder is situated beneath the lower end of the feeder. A tube is coupled to the second hopper to receive the bottle caps. A vacuum pump has an input coupled to the tube and an output for delivering the bottle caps at the remote elevated location.

1 Claim, 4 Drawing Sheets

BOTTLE CAP ELEVATOR

CROSS-REFERENCES

The present application claims the benefit of a U.S. Provisional Patent Application Ser. No. 60/247,331, filed Nov. 10, 2000 in the name of inventor David Tye and commonly assigned herewith.

FIELD OF THE INVENTION

The present invention relates to bottle caps. More particularly, the present invention relates to an apparatus for sending bottle caps to an elevated remote location.

BACKGROUND OF THE INVENTION

Polycarbonate bottles are commonly used to store water. Because of their sturdiness, the same bottles are cleaned and reused many times over their lifetimes. Bottle caps are placed on the bottles using machines having a receptacle located above the bottles to be capped.

In order to load the receptacle with caps, an operator may climb up a ladder with a load of caps. Other more sophisticated approaches may use automated conveyors to carry the caps up to the receptacle area.

The problem with these approaches is their relatively slow transportation speed. For instance, carrying a load of caps manually while climbing up a ladder is time consuming, potentially dangerous, and inefficient. The use of a conveyor may be more efficient but its speed is still relatively slow.

Another problem with these approaches is the distance between the supply of bottle caps and the receptacle. It may be very burdensome for an operator to carry a load of caps for a long distance. Although a conveyor may accommodate the distance problem, the construction of a long conveyor can be expensive. In addition, conveyors are usually limited to linear paths and take up a lot of space.

Accordingly, a need exists for a fast and efficient mode of transportation for bottle caps to a remote elevated location.

BRIEF DESCRIPTION OF THE INVENTION

An apparatus for sending bottle caps to a remote elevated location has a first hopper for temporarily storing bottle caps. The first hopper receives a supply of bottle caps. A feeder has an upper end and a lower end. The upper end of the feeder is coupled with the first hopper to receive bottle caps. A second hopper for receiving bottle caps from the feeder is situated beneath the lower end of the feeder. A tube is coupled to the second hopper to receive the bottle caps. A vacuum pump has an input coupled to the tube and an output for delivering the bottle caps at the remote elevated location.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a bottle caps elevator. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
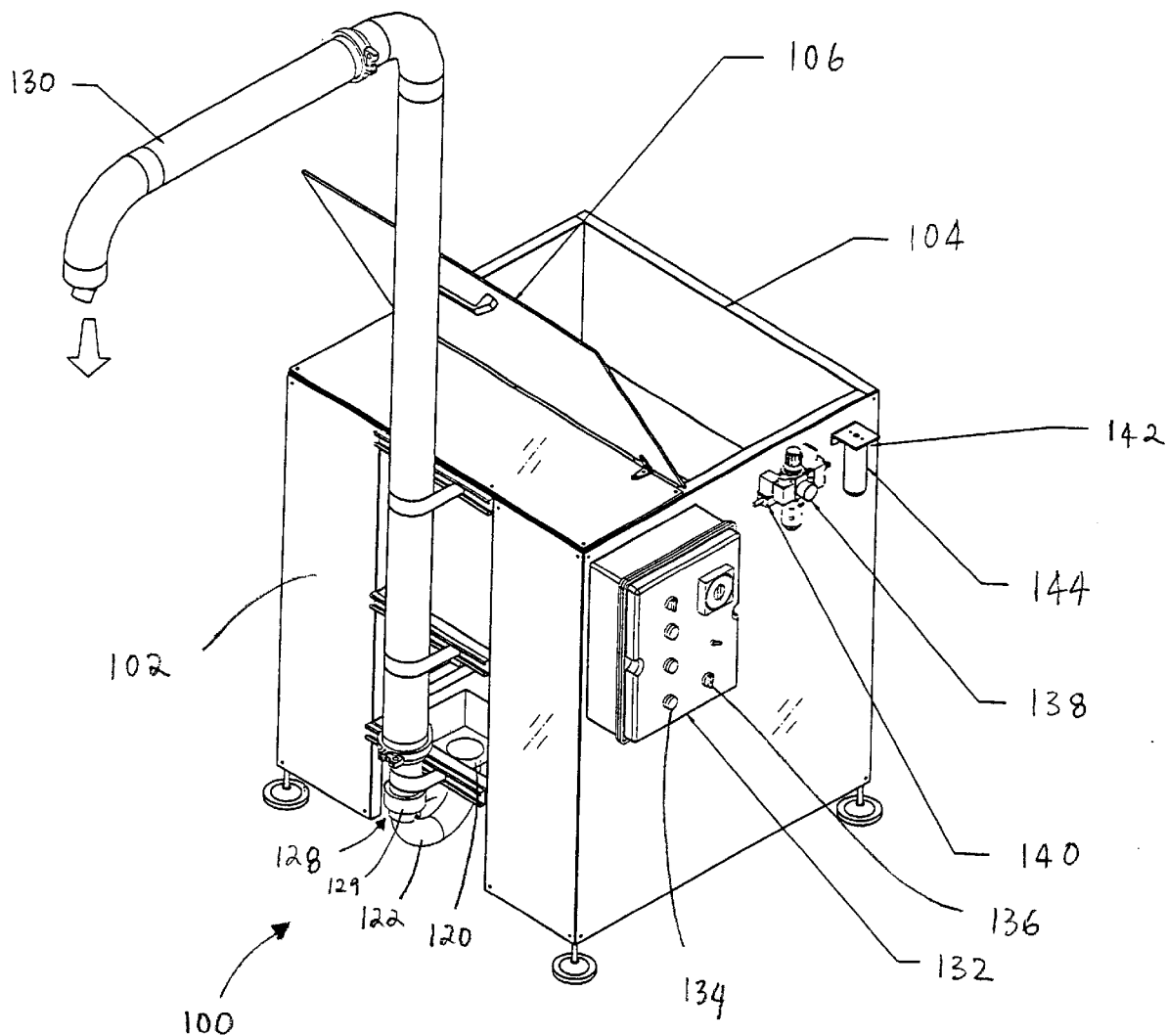
FIG. 1 is a front perspective view of an apparatus for sending bottle caps to a remote elevated location.
Figure 2:
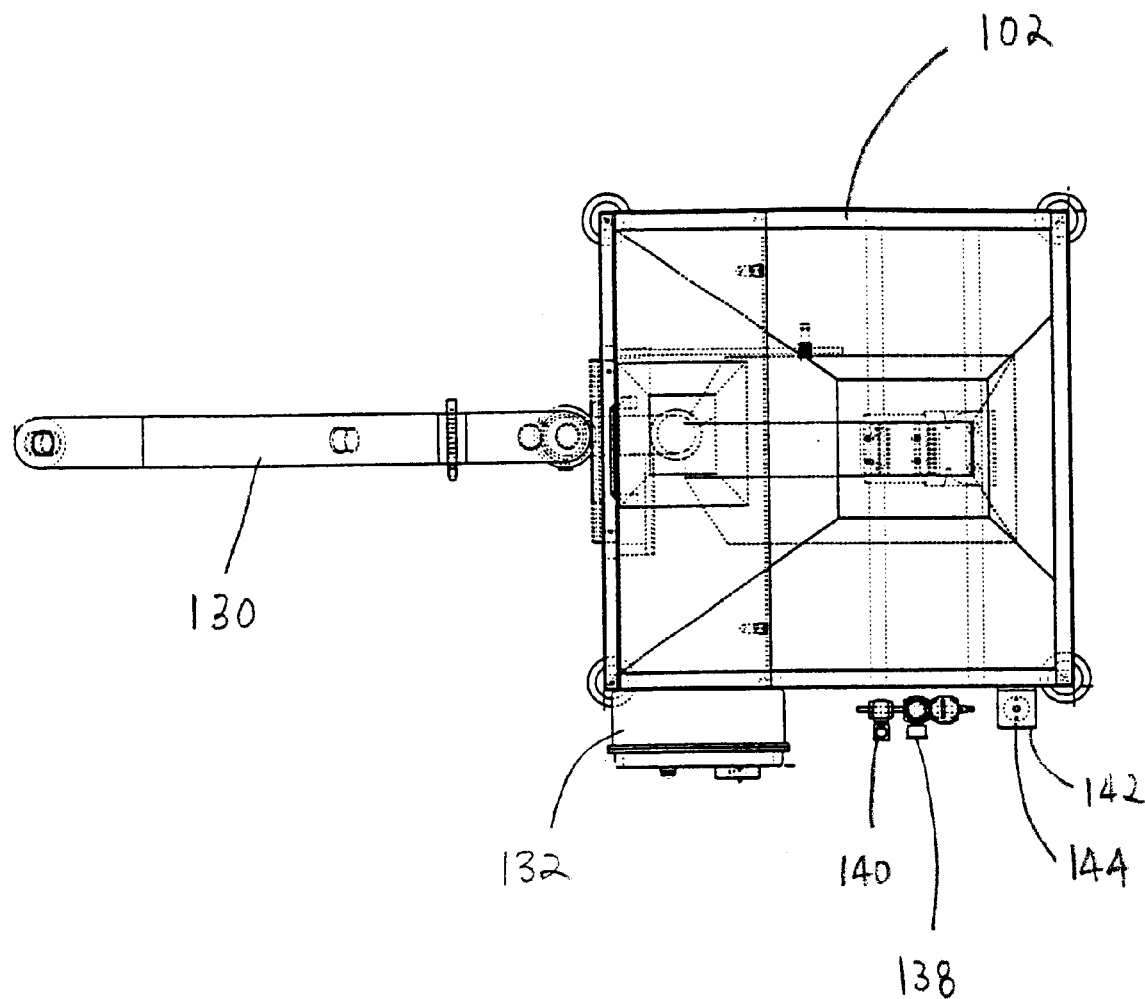
FIG. 2 is a top view of a device for an apparatus for sending bottle caps to a remote elevated location.
Figure 3:
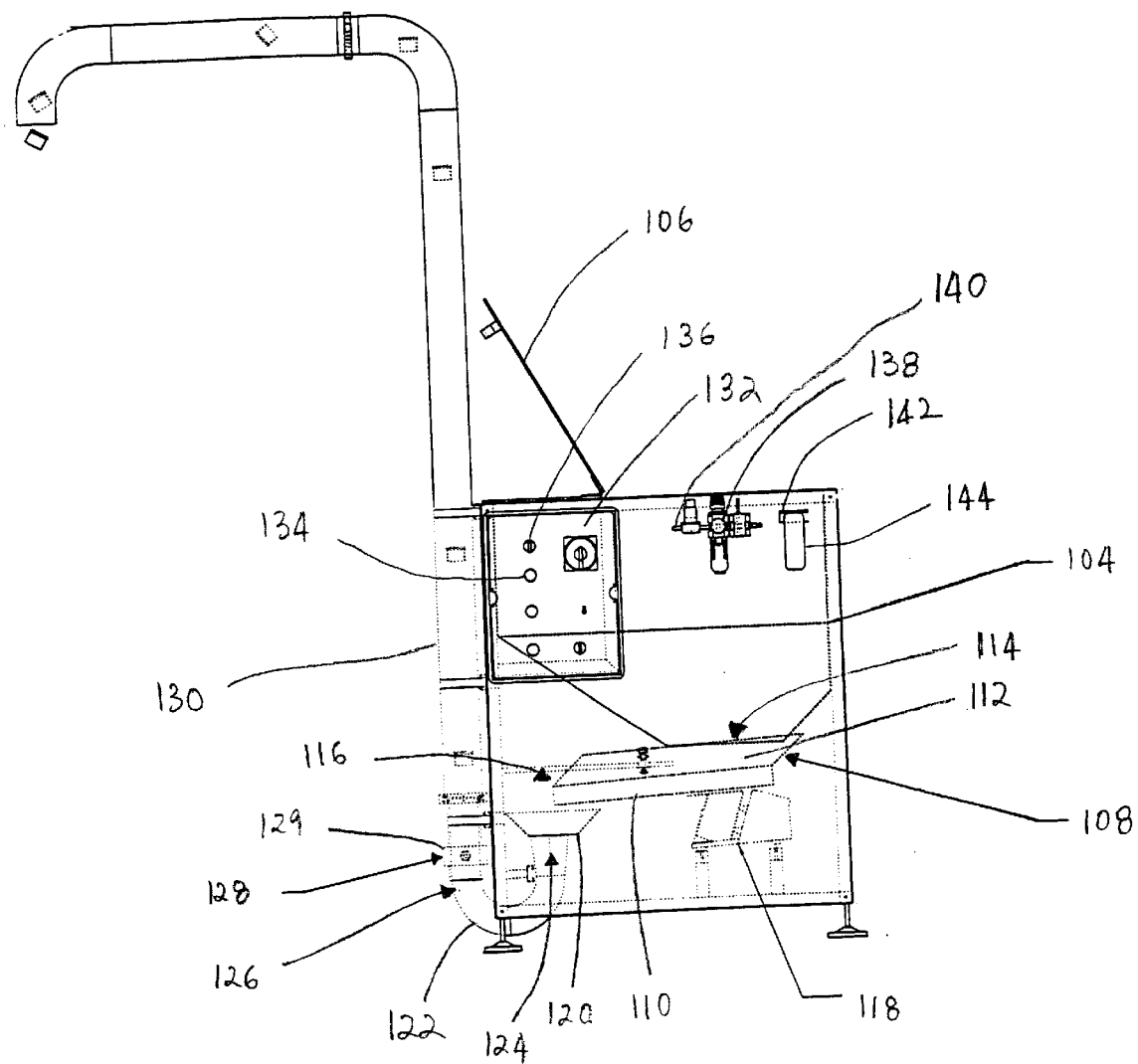
FIG. 3 is a side view of a device for an apparatus for sending bottle caps to a remote elevated location.

With respect to FIGS. 1, 2 and 3, an apparatus 100 for sending bottle caps to a remote location has a frame 102. Frame 102 is preferably in a box shape. A cap hopper 104 for receiving and temporarily storing bottle caps is mounted within frame 102. Cap hopper 104 is preferably situated in the upper part of frame 102. A cap hopper door 106 hinges on top of frame 102 to cover cap hopper 104. A cap feeder 108 is positioned underneath cap hopper 104 to receive bottle caps from cap hopper 104. Cap feeder 108 has an elongated trough 110 flanked on both sides with a slanted plate 112 for guiding caps down cap feeder 108. Cap feeder 108 has a first end 114 and a second end 116. First end 114 is positioned under cap hopper 104. Second end 116 height is relatively lower than first end 114 producing a downward angle so that bottle caps fall toward second end 116.

A motor 118, preferably electrical, or of any other convenient type, is mechanically coupled to cap feeder 108. Motor 118 creates vibrations that are transmitted to cap feeder 108 so that the vibrating motion produces a downward motion of bottle caps within trough 110.

An output hopper 120 is positioned below second end 116 to receive bottle caps. Output hopper 120 has a wide end positioned adjacent to second end 116 of cup feeder 108. A tube 122 in the shape of the letter "U" has a first opening 124 and a second opening 126. First opening 124 is connected with the narrow end of hopper 120.

A vacuum pump 128, preferably a venturi-type vacuum pump, having an input and an output, has its input coupled with second opening 126 of tube 122. Vacuum pump 128 has an exterior annular ring 129 that has a number of orifices (not shown) leading into the body of vacuum pump 128. A transfer pipe 130 is coupled to the output of vacuum pump 128 and links the apparatus to a remote location. Transfer pipe 130 has several directional sections. For example, vacuum pump 128 is coupled with section of transfer pipe 130 that is vertically oriented for sending bottle caps upward, to a height preferably above the present apparatus and above a receiving machine at a remote location. Another section of transfer pipe 130 may be horizontally oriented and disposed between the vertical section of transfer pipe and the remote location.

An air inlet 142 coupled with an air filter 144 is mounted on frame 102. An air regulator 140 is coupled with an air pressure gauge 138. Both air regulator and air pressure gauge 138 are mounted on frame 102. Several vent outlets (not shown) may be mounted on frame 102 right above small hopper 120 and pointed towards cap feeder 108. Vent outlets (not shown) further mix the bottle caps falling down cap feeder 108.

Figure 4:
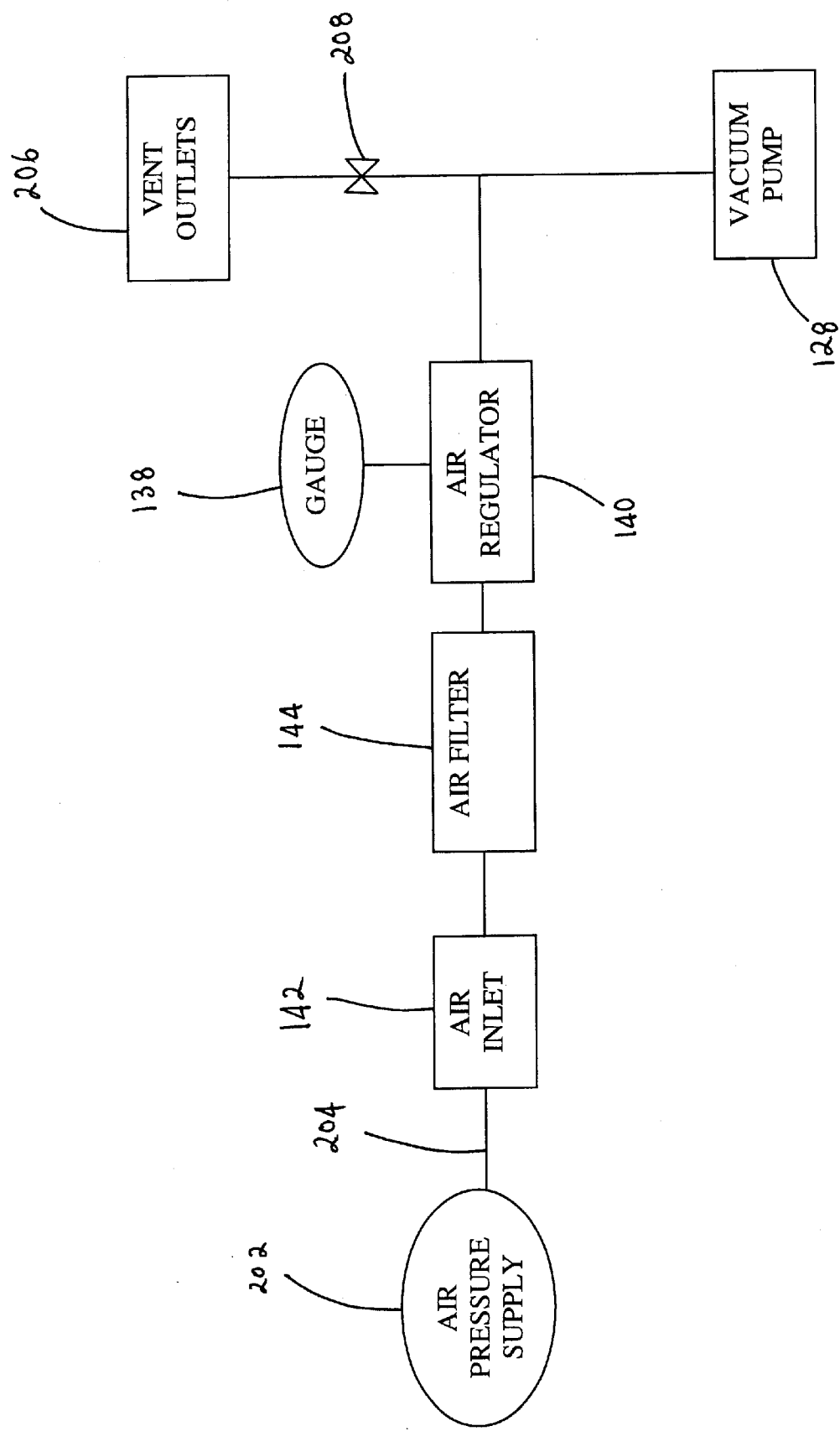
FIG. 4 is a system block diagram of a pneumatic diagram for an apparatus for sending bottle caps to a remote elevated location.

FIG. 4 is a schematic of a pneumatic circuit for apparatus 100. An air pressure supply 202 supplies air pressure to air inlet 142. The air pressure travels through a conduit 204. Air filter 144 coupled with air inlet 142 filters the air. Regulator 140 is coupled to air filter 144 to allow an operator to control and regulate the supplied air pressure. A measuring device, preferably air pressure gauge 138, is coupled to regulator 140 for measuring the controlled air pressure supply. The regulated air pressure is then fed into vacuum pump 128. As commonly known in the art, vacuum pump 128, a venturi-type, uses the supplied air pressure to create a vacuum in tube 122. The supplied air pressure can also be used to mix the bottle caps in cap feeder 108 using vent outlets 206. A valve 208 may control the air pressure leaving vent outlets 206.

A control panel 132 may be mounted on frame 102. Control panel 132 may allow an operator to monitor the use of the apparatus. Lights 134 affixed on control panel 132 may be used to alert an operator when bottle caps are sent or when cap hopper 104 is empty. Also, an operator may have the option to control the vibration of motor 118 via a dial or a switch 136 for facilitating the flow of bottle caps down cap feeder 108. Switch 136 may control valve 208 for controlling vent outlets.

During the operation of the apparatus, bottle caps are poured into cap hopper 104. The caps fall toward cap feeder 108. Motor 118 creates vibration throughout cap feeder 108 to facilitate the flow of bottle caps down cap feeder 108. Vent outlets continuously or sporadically blow air towards the bottle caps agitating the bottle caps. Once some bottle caps fall down through small hopper 120, they land in tube 122. Vacuum pump 128 creates a vacuum in tube 122 absorbing the bottle caps and sending them through pipe 130 first upward to a height above the present apparatus. The bottle caps then travel along pipe 130 layouts and are dropped in a remote location.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An apparatus for sending bottle caps to a remote elevated location, the apparatus comprising:

storing means for temporarily storing bottle caps;

feeding means for feeding the bottle caps from said storing to a sending area;

projecting means for projecting the bottle caps from the sending area; and conducting means for conducting the bottle caps to the remote elevated location from the sending area.

* * * * *